(12) United States Patent
Catherwood et al.

(10) Patent No.: US 10,120,815 B2
(45) Date of Patent: Nov. 6, 2018

(54) CONFIGURABLE MAILBOX DATA BUFFER APPARATUS

(71) Applicant: Microchip Technology Incorporated, Chandler, AZ (US)

(72) Inventors: Michael Catherwood, Georgetown, TX (US); David Mickey, Chandler, AZ (US); Bryan Kris, Gilbert, AZ (US)

(73) Assignee: MICROCHIP TECHNOLOGY INCORPORATED, Chandler, AZ (US)

( * ) Notice: Subject to any disclaimer, the term of this patent is extended or adjusted under 35 U.S.C. 154(b) by 217 days.

(21) Appl. No.: 15/184,789

(22) Filed: Jun. 16, 2016

(65) Prior Publication Data

US 2016/0371200 A1    Dec. 22, 2016

Related U.S. Application Data

(60) Provisional application No. 62/181,379, filed on Jun. 18, 2015.

(51) Int. Cl.
*G06F 3/00*  (2006.01)
*G06F 13/10* (2006.01)
*G06F 13/16* (2006.01)
*G06F 13/20* (2006.01)
*G06F 13/42* (2006.01)
*G06F 15/167* (2006.01)

(52) U.S. Cl.
CPC .......... *G06F 13/102* (2013.01); *G06F 13/16* (2013.01); *G06F 13/20* (2013.01); *G06F 13/42* (2013.01); *G06F 15/167* (2013.01)

(58) Field of Classification Search
CPC ........ G06F 13/102; G06F 13/16; G06F 13/20; G06F 13/42; G06F 15/167
See application file for complete search history.

(56) References Cited

U.S. PATENT DOCUMENTS

| 6,496,880 B1 | 12/2002 | Ma et al. .................... 710/38 |
| 6,912,716 B1 * | 6/2005 | Johanson ................ G06F 9/544 709/214 |
| 8,171,279 B2 * | 5/2012 | Kwon ..................... G06F 15/16 711/147 |
| 2013/0160028 A1 | 6/2013 | Black ........................ 719/314 |

OTHER PUBLICATIONS

International Search Report and Written Opinion, Application No. PCT/US2016/038115, 9 pages, dated Sep. 23, 2016.

* cited by examiner

*Primary Examiner* — Idriss N Alrobaye
*Assistant Examiner* — Richard B Franklin
(74) *Attorney, Agent, or Firm* — Slayden Grubert Beard PLLC

(57) ABSTRACT

A single chip microcontroller has a master core and at least one slave core. The master core is clocked by a master system clock and the slave core is clocked by a slave system clock and wherein each core is associated with a plurality of peripheral devices to form a master microcontroller and a slave microcontroller, respectively. A communication interface is provided between the master microcontroller and the slave microcontroller, wherein the communication interface has a plurality of configurable directional data registers coupled with a flow control logic which is configurable to assign a direction to each of the plurality of configurable data registers.

26 Claims, 9 Drawing Sheets

CONFIGURABLE MAILBOX DATA BUFFER APPARATUS

RELATED PATENT APPLICATION

This application claims priority to U.S. Provisional Patent Application No. 62/181,379; filed Jun. 18, 2015; which is hereby incorporated by reference herein for all purposes.

TECHNICAL FIELD

The present disclosure relates to a multi-processor embedded systems, such as microcontrollers with multiple cores and in particular to a configurable mailbox data buffer apparatus for such an embedded system.

BACKGROUND

Multi-processor core microcontrollers may be designed with entirely separated cores and each core may operate on a different system clock. Thus, to provide for the ability to communicate between the two cores, a specific communication interface is necessary. In particular, a means to quickly and reliably move small amounts of data across a clock boundary between two processors is needed. Solution had to be fully configurable yet be efficient with regards to silicon use.

SUMMARY

According to an embodiment, a single chip microcontroller may comprise a master core and at least one slave core, wherein the master core is clocked by a master system clock and the slave core is clocked by a slave system clock and wherein each core is associated with a plurality of peripheral devices to form a master microcontroller and a slave microcontroller, respectively, further comprising a communication interface between the master microcontroller and the slave microcontroller, wherein the communication interface comprises a plurality of configurable directional data registers coupled with a flow control logic which is configurable to assigned a direction to each of the plurality of configurable data registers.2. The single chip microcontroller according to claim 1, further comprising fuses to configure each directional data registers.

According to a further embodiment, the single chip microcontroller may further comprise configuration registers to configure each directional data registers. According to a further embodiment, the single chip microcontroller may further comprise a handshake logic block configured to provide handshake signals between the master and slave core with respect to the plurality of configurable directional data registers. According to a further embodiment, the communication interface can be further configurable to define a plurality of mailboxes, wherein a configurable number of consecutive data registers of said plurality of configurable data registers is assigned to each mailbox. According to a further embodiment, the single chip microcontroller may further comprise fuses to configure each directional data registers. According to a further embodiment, the single chip microcontroller may further comprise configuration registers to configure each directional data registers. According to a further embodiment, a data direction of a configurable data register can be assigned during programming of the single chip microcontroller. According to a further embodiment, assignment of registers to a mailbox and a data direction of each of the plurality of configurable data register can be programmed during programming of the single chip microcontroller. According to a further embodiment, each data register can be controlled by a direction signal and a handshake signal. According to a further embodiment, one of said configurable registers of a mailbox can be used as a control register. According to a further embodiment, at least one of said plurality of configurable data registers can be as a status register. According to a further embodiment, at least one of said plurality of configurable data registers can be as a command register. According to a further embodiment, the single chip microcontroller may further comprise a plurality of multiplexers for defining either a write path only from the master core to one of the configurable data register and a read path from the one of the configurable data register to the salve core or a write path only from the slave core to one of the configurable data register and a read path from the one of the configurable data register to the master core. According to a further embodiment, when the write path from the master or slave core to one of the configurable data register is set, respectively, a read path from the one of the configurable data register to the master or slave core is available. According to a further embodiment, when the write path from the master core to one of the configurable data register is set, the master clock provides a clock for writing the one of the configurable data register and the slave clock provides a clock for reading the one of the configurable data register. According to a further embodiment, when the write path from the slave core to one of the configurable data register is set, the slave clock provides a clock for writing the one of the configurable data register and the master clock provides a clock for reading the one of the configurable data register. According to a further embodiment, the single chip microcontroller may further comprise a read FIFO memory and a write FIFO memory within the communication interface, wherein the read FIFO memory comprises a data input coupled with the slave core and a data output coupled with the master core and the write FIFO memory comprises a data input coupled with the master core and a data output coupled with the slave core. According to a further embodiment, the read FIFO memory and write FIFO memory may be optionally enabled through a configuration register. According to a further embodiment, the single chip microcontroller may further comprise a plurality of slave cores, wherein the communication interface comprises a plurality of data registers sets, each data register set comprising a plurality of configurable directional data registers coupled with a flow control logic which is configurable to assigned a direction to each of the plurality of configurable data registers.

According to another embodiment, in a method for providing communication between a master core and a slave core on a single chip microcontroller, wherein the master core is clocked by a master system clock and the slave core is clocked by a slave system clock and wherein each core is associated with a plurality of peripheral devices to form a master microcontroller and a slave microcontroller, respectively, the method comprising: providing a communication interface between the master microcontroller and the slave microcontroller, configuring a plurality of configurable directional data registers coupled with a flow control logic to form respective mailboxes, configuring for each of the plurality of configurable directional data registers a data direction from or to the master core; exchanging data between the master core and the slave core only through said plurality of configurable directional data registers.

According to a further embodiment of the method, the steps of configuring is performed through fuses during programming of the single chip microcontroller. According to a further embodiment of the method, the step of exchanging can be performed with handshake signals between the master and slave core. According to a further embodiment of the method, a configurable number of consecutive data registers of said plurality of configurable data registers can be assigned to each mailbox. According to a further embodiment of the method, one of said configurable registers of a mailbox can be used as a control register. According to a further embodiment of the method, at least one of said plurality of configurable data registers can be used as a status register or a command register.

DETAILED DESCRIPTION

Figure 1:
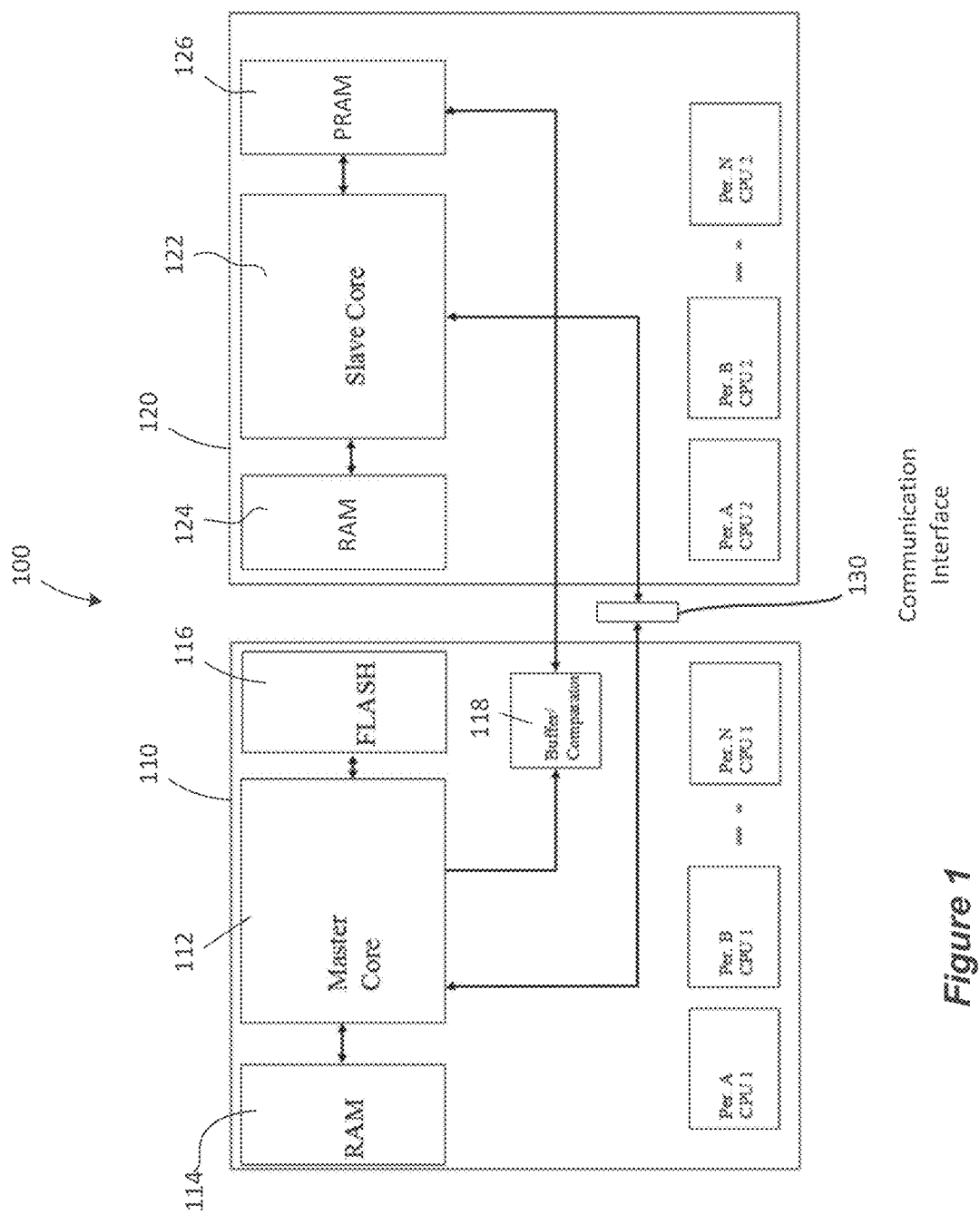
FIG. 1 shows a block diagram of a first embodiment of a dual-core microcontroller.
Figure 2:
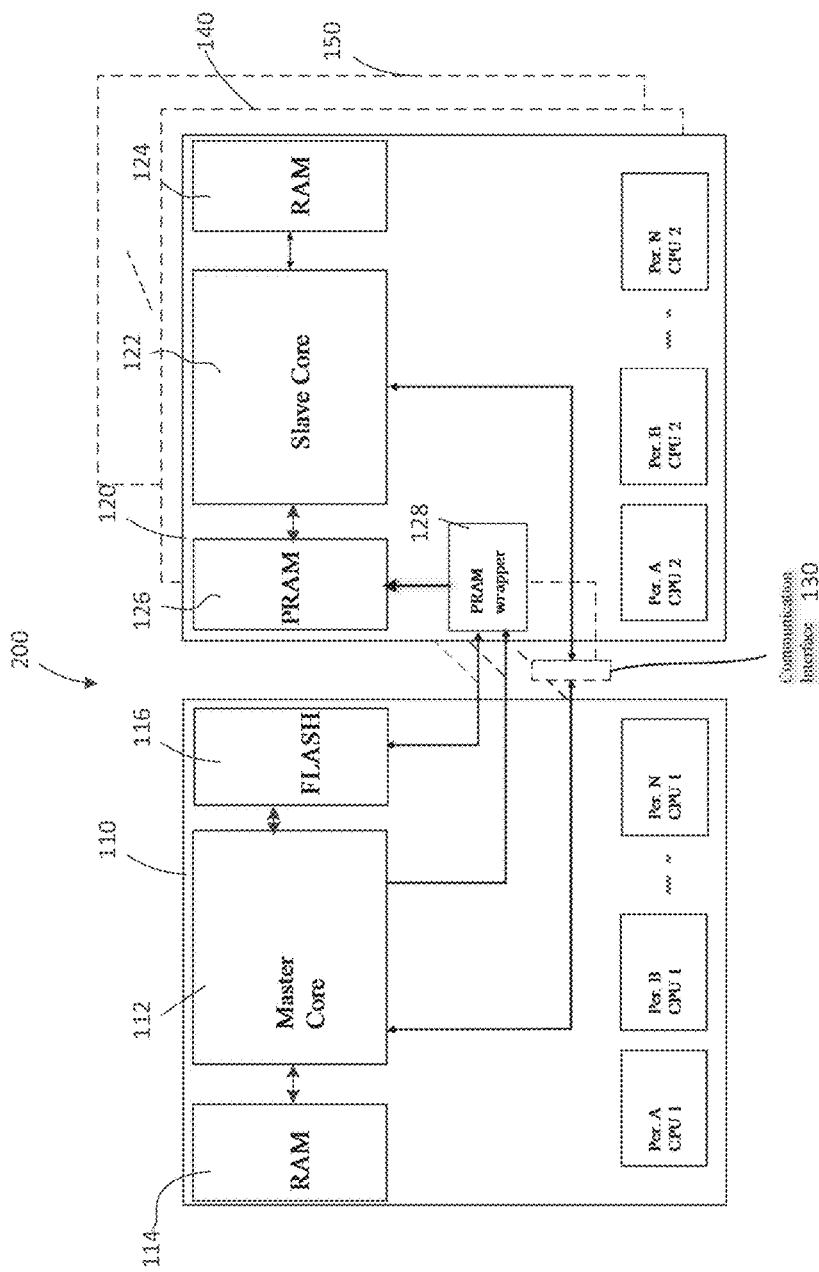
FIG. 2 shows a block diagram of a second embodiment of a dual or multi-core microcontroller.

As shown in FIGS. 1 and 2, a dual or multi core processing device 100, 200 can be designed to have a master microcontroller 110 with a master central processing unit (CPU) 112 and one or more slave units 120 each having a slave central processing unit 122 wherein a core design of each slave central processing unit 122 may be generally identical or similar to the core design of the master CPU 112. However, according to other embodiments, the slave CPU 122 may be different from the master CPU 112. The master microcontroller has its own set of peripheral devices as shown in FIGS. 1 and 2. A slave unit 120 may or may not have its own set of peripheral devices and, thus, form a microcontroller by itself. Thus, each master and slave device form more or less completely independent processing devices and may communicate with a dedicated bus or communication interface 130. FIGS. 1 and 2 shows such a design with a master microcontroller 110 and a single or multiple slave microcontroller(s) 120. A communication interface 130 is provided that allows for communication between the two cores 110, 120. Each processor 112, 122 may be designed in a Harvard architecture as shown. However, the principles according to the various embodiments may be easily translated into a von Neumann architecture. The master unit comprises, e.g., flash memory 116 used as the program memory and random access memory 114 used as data memory, each coupled with the master core 112.

As shown in FIGS. 1 and 2, the slave unit 120 can be designed without flash memory. Instead a dedicated program random access memory 126 is provided. Due to the fact that this memory is volatile it will be loaded through the master 110 according to various embodiments. This design choice has the advantage that a bottleneck provided by flash technology is avoided. Flash memory is generally slower than RAM. Hence, there will be no read delays and the slave can be operated at a higher execution speed which may be very beneficial for certain high speed applications such as, e.g., SMPS applications. As stated above, more than one slave unit 120 may be implemented according to various embodiments. In case both cores are identical, the master core 112 can be designed to include additional instructions which may either not be implemented in the slave unit 122 or non functional in the slave unit. These additional instructions allow the transfer of data from the flash memory 116 or from an external source into the PRAM 126 of the slave device 120. For example, according to an embodiment, multiple cores may be implemented within a single chip device and each core may have an assigned configuration register, wherein one of the bits of such a register may define whether the respective unit is a master or a slave. Logic may be present that allows for only one of the cores to be set as a master. Once this bit has been set, the additional instruction may be allowed to be executed. In the other units (slaves) these instructions may not be executed, for example, they could be interpreted as illegal opcodes.

Control logic to access the PRAM 126 by the master unit 110 can be either located in the master unit as shown in FIG. 1 with buffer/comparator unit 118. Alternatively, a similar unit may be arranged within the slave unit 120 as shown in FIG. 2 with PRAM wrapper unit 128. Either unit is designed to grant access of the PRAM either exclusively to the master unit 110 or to the slave unit 120. Other embodiments may place some part of the logic within the master core and other parts in the salve core or arrange the logic outside both units. Similarly, communication interface 130 may be insider either unit or entirely outside both units. Additional control for the PRAM access units 118 or 128 may be provided by the communication interface 130 as indicated in FIG. 2 with the dotted line. FIG. 2 also shows additional slave units 140 and 150 with dotted lines. All units may connect through a bus and associated wrapper units 128 in each slave unit. The embodiments are therefore not limited to a dual core implementation. A person skilled in the art will realize that other implementations are possible.

According to various embodiments, there are two approaches offered to transferring data between the Master and Slave processors. The mailbox based data pipe is the default approach and always present. The FIFO based data pipe is a parametrized option. Each approach has benefits and disadvantages.

According to various embodiments, a set of fuse configurable bi-directional n-bit "mailbox" registers is provided within the communication interface 130 coupled with a few blocks of data flow control logic that can be fuse assigned to any mailbox. "Bi-directional" throughout the specification means with respect to a register that one of two directions can be chosen when the register is configured. In operation each register is uni-directional. However, a mailbox may be considered bi-directional as it may include registers that are configured to operate in either direction. In a 16-bit dual-core microcontroller these registers will be n=16 bit wide. Some additional buffering eliminates clock multiplexing issues and avoids having to duplicate the mailboxes in each direction. Blocks of addressed data ranging between one word and 16 words may therefore become a mailbox, wherein according to some embodiments the last register to be written/read will direct the hardware data flow control protocol. Because the direction of each data register is programmable, referencing Master or Slave is not meaningful when discussing data transfer protocol. The terms "transmitter" and "receiver" are therefore subsequently used to represent the data write and read processors respectively. Depending upon the data register direction, the data write and read processors could be either Master and Slave, or Slave and Master respectively.

According to some embodiments, a mailbox register operational data direction can be determined, for example, by a device fuse (one per mailbox). This may be made practical by use of a novel mailbox register design structure as will be explained in more detail below.

Access to the (shared resource) data registers within a mailbox is controlled using the data flow control protocol. Consequently, access to a mailbox based data pipe is mutually exclusive (i.e. it cannot be accessed simultaneously by both processors). Each processor must complete its access prior to handing access control to the other.

However, all contents of the mailbox will be memory mapped and do not have to be accessed in any particular order (with the exception of the mailbox register assigned to handle the hardware data flow control protocol which must be accessed last by both processors).

Furthermore, the mailboxes that constitute the software managed buffer are not required to be sequentially addressed in memory. This may be beneficial in applications where the data being transferred consists of a mixture of control, status and system data. Furthermore, for mailboxes that consist of more than one data register, the direction of all the data registers within the mailbox does not have to be the same. The data flow control protocol is used to transfer access control between the Master and Slave but only the data register assigned to the protocol hardware must comply with the required data direction rules. A couple of possible organizations of the mailboxes into buffers of various size, direction and capability will be explained in more detail below with respect to FIG. 4. These are only to demonstrate the mailbox scheme flexibility and are not intended as specific usage models. Other configurations are possible.

Each data flow control logic block may be assigned to any mailbox based on a fuse bit field setting (one bit field per data flow control block). The consequence of the above is that the user may define a data buffer of any size up to the number of mailboxes supported, which may be limited. A data flow control logic block would be assigned to the last element of the buffer to be written. Elements (i.e., individual mailbox registers) within the buffer may be configured for operation in either direction (i.e., data within the buffer may be both written and read).

Simply multiplexing source and destination processor clocks to read and write data registers introduces design timing issues making it impractical (and forcing the instantiation of 2 mailboxes, one per direction). However, supporting a write buffer on both sides and a common read buffer (with a multiplexed clock delayed from the write clock) which pipelines the write data, resolves the timing issues and leads to an efficient design according to various embodiments.

Data conduits across clock boundaries are typically unidirectional for reasons outlined above. The data flow control is typically associated with each element of a data conduit across a clock boundary or other interface. According to various embodiments, fuses can be used to assign handshake logic to reduce design complexity (mostly to reduce special function register requirements).

Fuses are usually only set during configuration of the microcontroller, namely when the master flash program is programmed, for example through an external programmer device. Usually, an initial configuration is designed for a specific application and does not need to be changed during runtime. Hence, the use of fuses may be preferred. However, other means to program the mailboxes may be used instead. For example, any type of non-volatile memory may be used instead of the fuses.

A multi-core microcontroller or embedded system may be designed to comprise a master core and a slave processor as shown in FIG. 1 or 2. As mentioned above, unlike a coprocessor, a slave processor is a fully functional stand-alone processor core and may have a plurality of assigned or assignable peripheral devices. Similarly, the master processor may have a plurality of assigned or assignable peripheral devices and run on its own clock. The different cores may therefore be clocked with different speeds, for example the slave core may use a higher clock to be able to control processing intensive tasks according to some embodiments. This is also made possible by the use of RAM as program memory which is generally faster than Flash memory.

According to various embodiments, a simple 16-bit data channel is created between the Master and Slave processors running asynchronously at different clock rates. Such a 16-bit channel may be designed to be initially bi-directional, wherein the direction may be fixed at program time through fuses or a configuration register, be robust and flexible and require only a minimal silicon footprint, in particular when using fuses for configuration.

Figure 3:
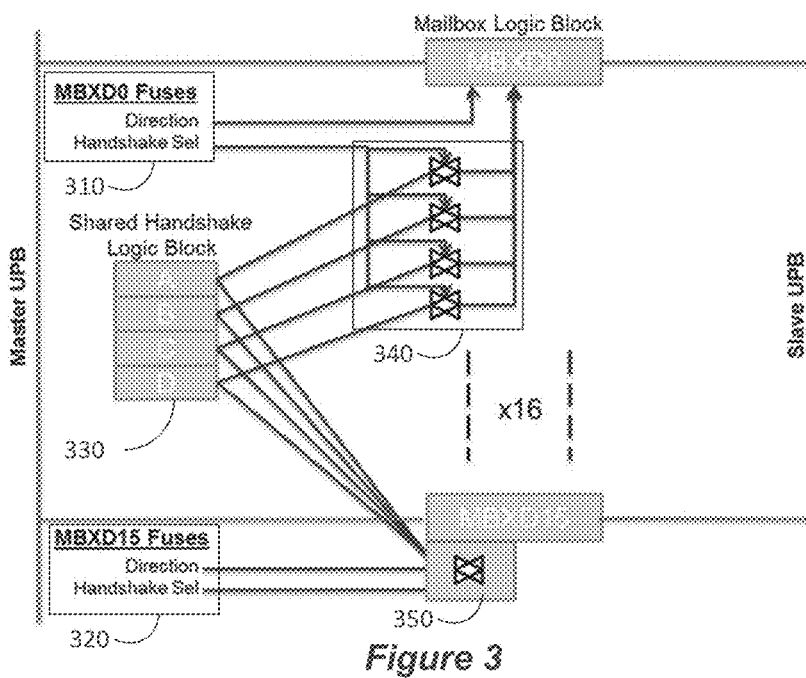
FIG. 3 shows a more detailed block diagram of communication interface according to various embodiments.

FIG. 3 shows a block diagram including a plurality of mailbox registers MBXD0 . . . MBXD15 associated logic 340, 350 and fuses 310, 320 as well as a master bus and a slave bus that will be linked by the mailbox registers MBXD0 . . . MBXD15. The fuses or configuration memory 310, 320 controls the direction and the handshake selection of each mailbox register. A shared handshake logic block 330 is also provided. According to one embodiment, sixteen mailbox registers may be arranged in a 16-bit dual core microcontroller. These registers can be assigned to different mailboxes, wherein each register can only be assigned to one mailbox.

Figure 4:
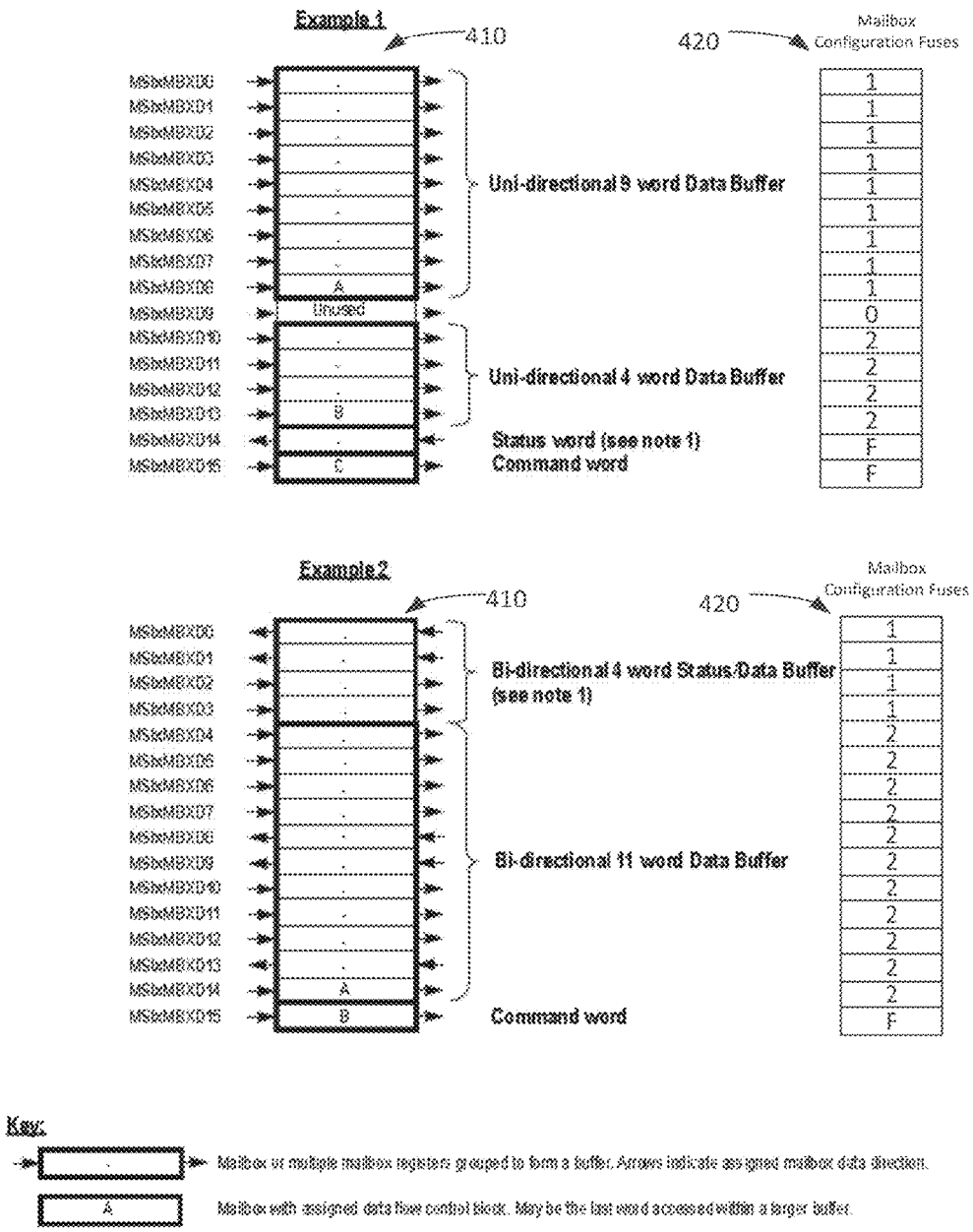
FIG. 4 shows exemplary mailbox configurations according to various embodiments.

FIG. 4 shows different possible configurations of the mailboxes in a Master/Slave data interface 130 that would include data, status and command words. It is to be noted that no H/W data flow control is assigned. Access is controlled via a software protocol. As shown in FIG. 4, the mailboxes can be divided into different sets of registers 410. To this end, configuration fuses 420 as shown, for example, on the right side of FIG. 4 may be used. The block of fuses 420 assigns the first 9 registers to the first mailbox, leaves the next register unused and assigns the next 4 registers to the second mailbox. The last two registers are used as status and command words by setting the fuse, e.g., to Fh or any other predefined value.

Example 1 shows an arrangement that supports 2 uni-directional buffers, a command word and a status word. A data flow control logic block is assigned to the last word accessed of each of the buffers (note that the buffer length is arbitrary within the limits of the number of mailboxes supported). A data flow control logic block is also assigned to the command word. However, access to the status word is controlled through software, so no data flow control logic block is required. Mailbox register MSIxMBXD9 is unused.

Example 2 shows an arrangement that supports 2 bi-directional buffers and a command word. A data flow control logic block is assigned to the last word accessed of one of the buffers but not the other. This is because the application can guarantee that only one processor will ever access the buffer after the other buffer access is complete. A data flow control logic block is also assigned to the command word.

Figure 5:
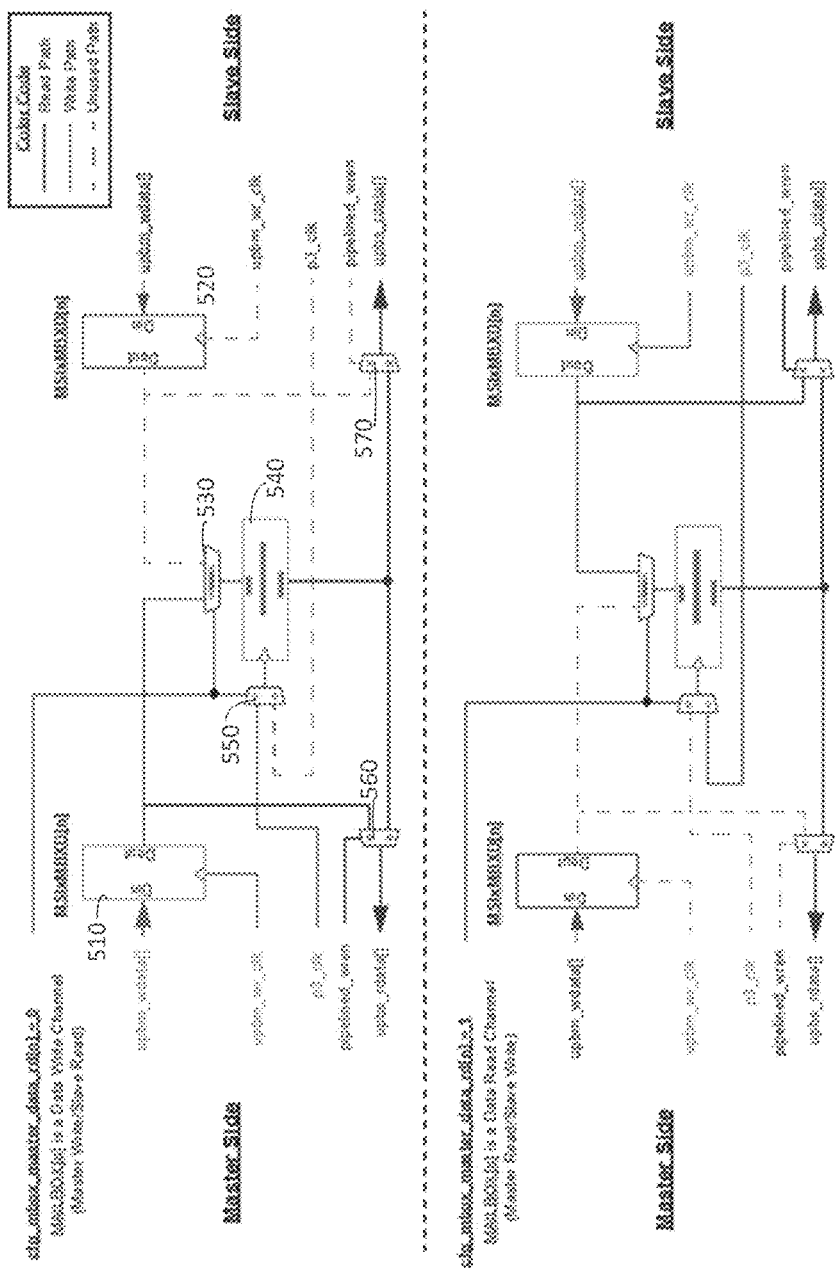
FIG. 5 shows a data write channel (top) and a data read channel (bottom)

FIG. 5 shows a data write channel in the top half and a data read channel in the bottom half of FIG. 5. The left side represents the master side and the right side the slave side. The actual mailbox 540 is accessed through multiplexer 530 via buffer registers 510 or 520 for write operations and directly for read operations. The mailbox 540 is generally controlled by the master core. However, the clock is provided by either the master or the slave through multiplexer 550. As shown in FIG. 5, a flag cfg_mbox_master_data_rd [n] determines whether the mailbox register is configured as a write channel (top of FIG. 5) or a read channel (bottom of FIG. 5) with respect to the master. Writing is only allowed by either the master or the slave whereas reading may be performed by either the master or the slave. Multiplexers 560 and 570 may be implemented according to an embodiment to support transmitter write immediately followed by a read, for example, because the actual mailbox update is delayed by a half cycle, and to select the actual mailbox register as the read source for the receiver.

According to an embodiment, for the transmitter, if a mailbox is written and then read within 1 cycle of the read, the hardware asserts pipelined wren and the read comes from the buffer register 510 or 520 which has just been written. If the mailbox is read at any point after 1 cycle after it is written, then pipeline wren=0 and the read is sourced from the actual mailbox register. But, the actual mailbox is always updated with the mailbox buffer 510 or 520. Other implementations are possible in which the transmit buffer is read. For the receiver, obviously the MBOX buffer 510/520 which is never written is not read, so signal pipelined wren=0 and the actual mailbox is selected.

Each of the 16 MSI mailbox data registers MSIxMBXDn (where 0<=n<=15), according to one embodiment, are identical other than their data direction. The arrangement may contain 8 data flow control protocol hardware blocks, according to some embodiments, each of which may be assigned to any data register to form a mailbox.

The following describes an exemplary embodiment of a communication interface in more detail. All mailbox MSIxMBXDn data registers are unidirectional such that register contents are never read/write from both the Master and Slave ports. Each MSIxMBXDn register is either read/write from the Master (as transmitter) and read only from the Slave (as receiver) or read/write from the Slave (as transmitter) and read only from the Master (as receiver), depending upon the selected channel data direction. This approach avoids data write conflicts and is intended to simplify the design.

Each mailbox data register may be fuse configured to be either a read or a write channel (from the Master perspective). For mailbox [n]:
 cfg_mbox_master_data_rd[n]=0: The data register is configured as a Master data write channel.
 cfg_mbox_master_data_rd[n]=1: The data register is configured as a Master data read channel This concept is to provide adequate flexibility in lieu of making all registers bi-directional (which complicates the design). The main drawback of such an approach is that the data direction of each register is fixed at run time.

An automated data flow control mechanism is supported according to various embodiments to control the flow of data through the mailboxes.

Each of the 8 data flow handshake protocol hardware block controls two Data Ready status flags (DTRDY_$\alpha$, where $\alpha$ is A, B, C, D, E, F, G or H) located in the MSIxMBXS registers. One flag is for the data transmitter and is located in the MSIxMBXS register on the transmit side of the interface. The other for the data receiver and is located in the MSIxMBXS register on the receive side of the interface.

The data transmitter is always assumed to be the transfer initiator, so a hardware data request from the data receiver is not required. Should the application require a data request to initiate a transfer, it must be handled through software. The receiving processor software will have to indicate to the transmitting processor that data is required. This may be achieved either through an interrupt, or through a mailbox based software command protocol.

Each of the handshake protocol hardware blocks has a fuse enable associated with it (cfg_mbox_handshake_enable_n[7:0]). The fuse must be programmed in order to enable the corresponding handshake protocol hardware block. Fuse cfg_mbox_handshake_enable_n[0] corresponds to handshake protocol hardware block A, cfg_mbox_handshake_enable_n[1] corresponds to handshake protocol hardware block B, etc.

Each of 8 protocol blocks is assigned to a specific MSI mailbox data register by eight, 4-bit fields within cfg_mbox_handshake_register_select[31:0]. The selected MSI mailbox register is referred to as the mailbox protocol data register. Unassigned mailbox registers are referred to as mailbox data registers. The protocol data register may be a single mailbox, or one mailbox register within a set of mailbox registers defined as a buffer through software. When mailboxes are defined as a buffer, the last buffer access must be to the protocol data register according to some embodiments. Similarly, when the receiving processor sees that data is ready and accesses the mailbox, the last buffer access must also be to the protocol data register.

When neither processor is accessing the mailbox, the data flow control hardware is in the idle state (MSIxMBXS.DTRDY_$\alpha$=0). The transmitting processor may now access the mailbox to start the data transfer data flow control. The data flow control operates as described below, where MSIxMBXDn is assumed to be assigned to protocol hardware block $\alpha$ (i.e., MSIxMBXDn is a protocol data register):
 1. Transmitting Processor:
  a) Write all but the last data word (if a buffer)
  b) Din→MSIxMBXDn (last data write); 1→DTRDY_$\alpha$ (automatic); Send a Ready To Read interrupt to receiver (automatic)
 2. Receiving Processor:
 Receive Ready To Read interrupt1
  a) Read all but the last data word (if a buffer)
  b) MSIxMBXDn_$\alpha$ Dout (last data read); 0→DTRDY_$\alpha$ (automatic); Send a Ready To Write interrupt to transmitter (automatic)
 3. Transmitting Processor:
 Receive Ready to Write interrupt
  a) 0→DTRDY_$\alpha$ (automatic2)
  b) Loop back to [1] and repeat as needed.

Figure 6:
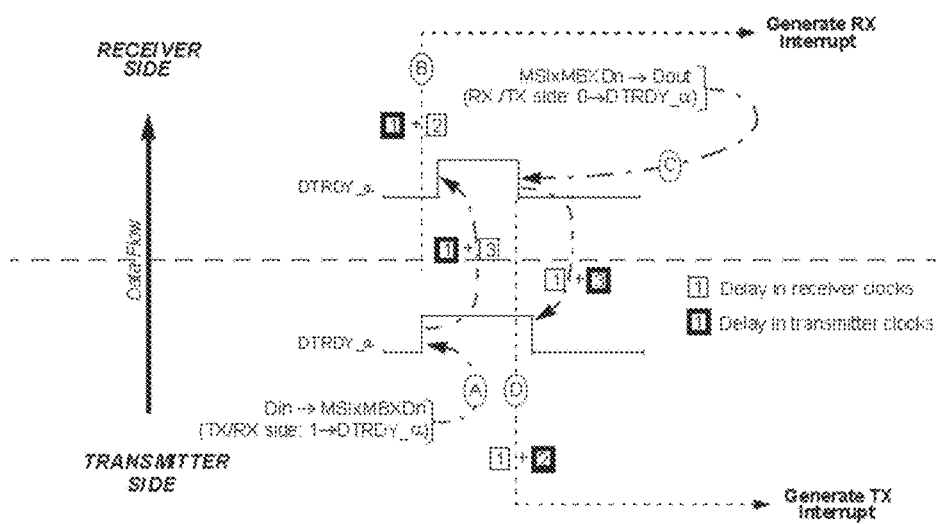
FIG. 6 shows a mailbox handshake protocol sequence diagram.

After step 3a, the data flow control is complete, and the transmitting processor my exit or proceed to send more data (i.e., loop back to step 1). A protocol sequence diagram is shown in FIG. 6. As noted above, setting of the DTRDY_$\alpha$ flag by a transmitter write to the MSIxMBXDn register, will result in a receiver data flow control protocol interrupt (Ready To Read) from the corresponding mailbox.

Similarly, clearing of the DTRDY_$\alpha$ flag by a receiver read of the MSIxMBXDn register, will result in a data transmitter data flow control protocol interrupt (Ready To Write) from the corresponding mailbox. For the data flow control to operate correctly, the transmitting processor must not send new data into the mailbox channel until it observes DTRDY_α=0. Similarly, the receiving processor must wait until DTRDY_α=1 before reading data from the mailbox (or it may read old data).

Although using interrupts is intended to be the primary method of managing the mailbox data flow control protocol, it is possible to also poll the status bits with software. In applications where the data sent through a mailbox is to be used within a periodic control process, software polling of the mailbox data flow control status flag could be the preferred approach. The transmitting and receiving processor polling software should test their respective DTRDY_α flag in order to determine the state of the data flow control. The meaning of the data flow control status bits from the perspective of the transmitting and receiving processors is as follows:

Transmitting Processor:
DTRDY_α=0: Ready to send data (mailbox empty or data stale)
DTRDY_α=1: Not ready to send data (mailbox not yet read)
Receiving Processor:
DTRDY_α=0: Ready to receive data (mailbox empty or data stale)
DTRDY_α=1: Data available to read (but not yet read)

The MSIxMBXDn registers are not subject to any device reset other than POR/BOR, so data is therefore preserved should the receiver software be able use it. The assumption is that if a receiver read is already underway (i.e., interrupt triggered, or DTRDY_α polled and found to be set), it is preferable to return valid (if old) data instead of a reset value. However, all DTRDY_α flow control bits (both Master and Slave) are subject to Master (upbm_reset_n) resets. This is necessary to initialize the data flow protocol blocks upon reset exit. Should the Master experience a reset, both the Master and Slave views of the protocol data flow control MSIxMBXS.DTRDY_α flags will be reset. Assuming that the Slave reset is decoupled from the Master (fuse MSRE=0) such that the Slave will continue to run in the event of a Master reset, should a Master (transmitter) write to the MSIxMBXDn register be immediately followed by a Master reset, the Slave (receiver) side interrupt request will not occur.

Should the Slave experience a reset, neither the Master nor Slave views of the DTRDY_α flow control bits will be reset. Should a Slave (transmitter) write to the MSIxMBXDn register be immediately followed by a Slave reset, the Master (receiver) side interrupt request will still occur as normal. Resetting both Master and Slave DTRDY_α flow control bits with a Master reset is also required to avoid a possible data collision condition. In the case of the Slave MSIxMBXS.DTRDY_α flag when the Master and Slave resets are not coupled (fuse MSRE=0) and a Slave reset will not disable the Slave (fuse SSRE=0), a possible data collision condition could arise if the Slave DTRDY_α flag were to be reset by a Slave reset.

If the Slave DTRDY_α flag were to be reset on a Slave reset, it could be possible for the Master to reset, resetting the Master view of the DTRDY_α flag but not that of the Slave. This would leave the (still running) Slave the opportunity to service the Slave DTRDY_α flag and read the corresponding mailbox, possibly while the Master is writing to it (assuming that it is empty because Master DTRDY_α=0.

A read from the MSIxMBXDn register by the receiver will only generate a data flow control protocol interrupt (Ready To Write) if the receiver DTRDY_α=1. If the receiver DTRDY_α=0 (which will be the case after the initial read of new data from the mailbox), a subsequent read of the mailbox by the receiver will have no effect (other than to return the data contents of the target mailbox).

This allows the mailbox to be used by the receiver for temporary storage of last data value moved through it. However, after data is read from a mailbox, its contents must be considered to be stale and subject to change (at any time) by the transmitter. Consequently, in order to manage mailbox temporary storage successfully, it is assumed that there is a software data transfer protocol in place such that the data receiver can prevent the data transmitter from arbitrarily overwriting the contents of the mailbox with new data. For example, if the receiver had to request data from the transmitter (via another mailbox or an interrupt), the transmitter will not overwrite the mailbox.

As is the case for any SFR, the MSIxMBXDn registers are both byte or word assessable. In order to support both byte and word sized data transactions when using data buffers, either an MS byte or word write of the transmitter protocol register will set the corresponding DTRDY_α flag. Similarly, either a MS byte or word read of the receiver protocol data register (on the other side of the MSI) will set the corresponding DTRDY_α flag.

The mailbox data registers may be accessed on the Master or Slave side of the MSI using DMA if available on the device. The mailbox data flow control protocol will generate interrupts that are compatible with DMA operation, allowing data within individual mailbox registers to be transferred without CPU intervention. DMA access of the mailboxes is also supported when the Master and/or Slave sub-systems are operating in Idle mode.

For the first DMA data value (or block) to be transferred, the assigned transmitter DMA channel may be triggered by software, or by manually writing the first data value (or block of data) in software. When the DMA writes to a mailbox protocol data register (last write in the case of a block transfer), the corresponding DTRDY_α flag will be set. Setting the transmitter DTRDY_α flag will generate a Ready to Read interrupt on the receiver side of the interface. The receiver Ready to Read interrupt (initiated after the mailbox protocol data register is written by the transmitter, setting DTRDY_α=1) will trigger the corresponding receiver DMA channel, and cause it to read the target mailbox (or mailboxes in the case of a block transfer). In doing so, it will clear the corresponding DTRDY_α flag. Clearing the receiver DTRDY_α flag will generate a transmitter Ready to Write interrupt on the transmitter side of the interface. This will trigger the assigned transmitter DMA channel to write the next data value (or block of data) and auto-set the DTRDY_α flag, starting the sequence again.

Because the mailboxes operate as a data conduit between to processors operating at unrelated clock speeds, all data and control signals must be synchronized as they move across the clock boundary. This will create delay between when the data was written and when it becomes available to be received. This is referred to as the mailbox channel latency.

The synchronization delay is 1 transmitter clock plus 2 receiver clocks from a transmitter write of MSIxMBXDn to the leading edge of the corresponding receiver interrupt request. The data will be available to be read by the receiver prior to assertion of the receiver interrupt request. For applications that poll the receiver DTRDY_α flag, the delay is 1 transmitter clock plus 3 receiver clocks from a transmitter write of MSIxMBXDn to the receiver DTRDY_α flag update.

Similarly, the delay from a receiver read of MSIxMBXDn to the leading edge of the corresponding transmitter interrupt request will be 1 receiver clock (to update the receiver DTRDY_α flag) plus 2 transmitter clocks. For applications that poll the transmitter DTRDY_α flag, the delay is 1 transmitter clock plus 3 receiver clocks from a receiver read of MSIxMBXDn to the leading edge of the corresponding transmitter interrupt request.

The protocol handshake is fully automatic, so all other delays that contribute to over data transfer latency will be a function of software polling, interrupt or DMA transfer latency.

For example, referring to FIG. 6, if we assume interrupts (with context switching enabled) are used to read/write data from/to a mailbox, and we exclude the time it takes to write data into the mailbox, the mailbox channel latency will be 1 (sync) transmitter clock plus 2 (sync)+5 (exception processing) receiver clocks from the end of the transmitter write cycle to the first receiver ISR instruction.

If the system uses a DMA channel to move data, the mailbox channel latency consists of the DMA transfer latency (3 cycles) and the synchronization latency described previously. That is, assuming a DMA channel is allocated to a mailbox in both the transmitter and receiver, the mailbox channel latency to move a word of data between the transmitter and receiver DMA buffers (assuming no bus arbitration delays are incurred) will be 3 (DMA transfer)+1 (sync) transmitter clocks plus 2 (sync) receiver clocks to the receiver DMA channel request. The data will arrive in the receiver buffer 3 receiver clocks later. However, the DMA will read the MSIxMBXDn during the first cycle of the transfer which will trigger the return signal to clear the transmitter DTRDY a flag and start another transfer. So the return latency will be 1 (DMA read)+1 (sync) receiver clocks plus 2 (sync) transmitter clocks to the next transmitter DMA channel request. The total round path delay per transferred word is therefore 6 transmitter clocks plus 4 receiver clocks.

The proposed embodiments provide for the ability to select and lock the data flow direction of a data channel via a fuse, the ability to assign one of a few data channel flow control (handshake) logic blocks to any mailbox, and the ability to create an implentation-friendly bi-directional data channel between asynchronous clock domains while avoiding logic duplication.

Figure 7:
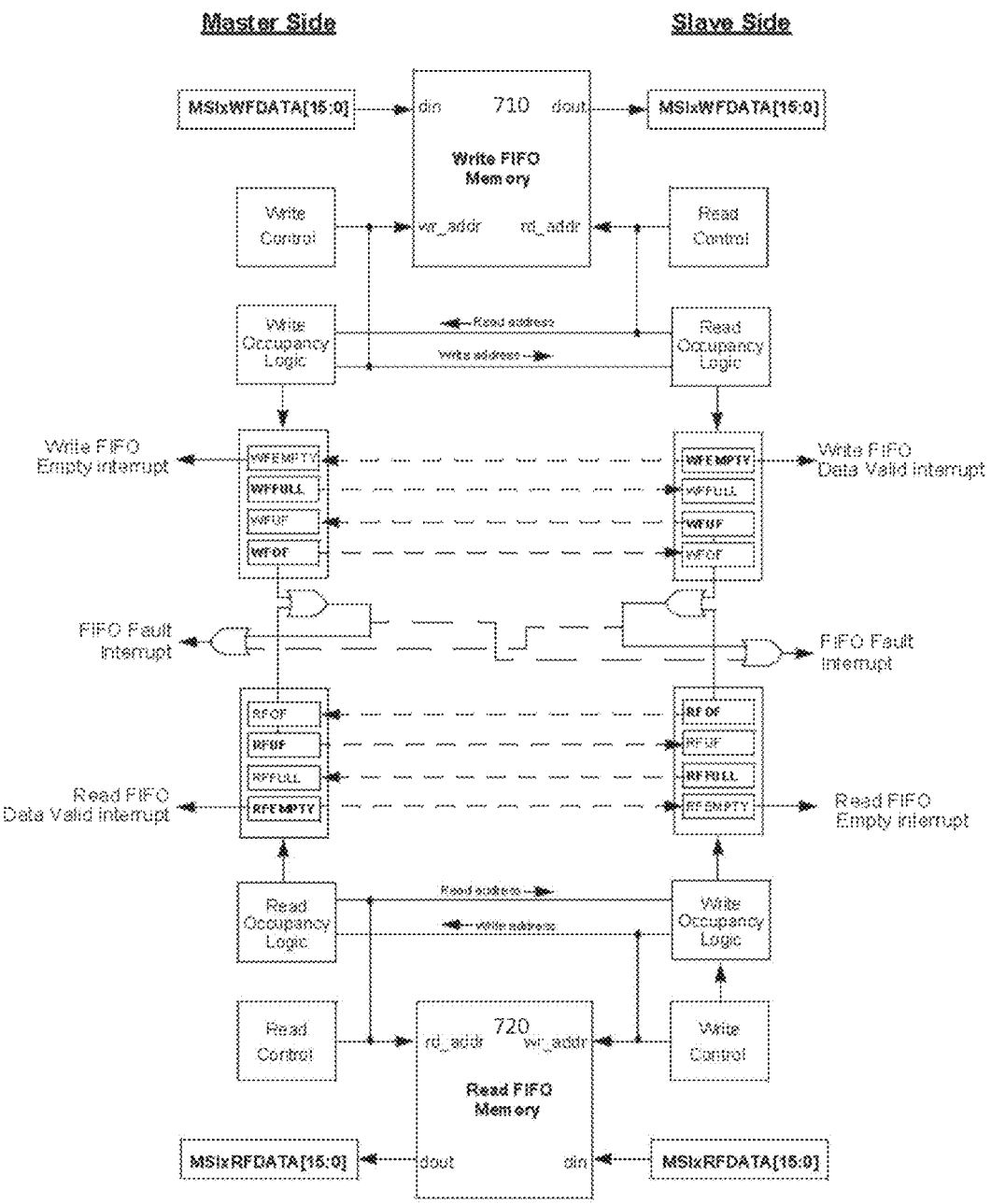
FIG. 7 shows a block diagram of an optional additional FIFO memory for dual or multi-core microcontroller.

FIG. 7 shows the additional optional FIFO data pipes. An embodiment of a dual or multi-core microcontroller may also include a set of two FIFOs 710, 720 as shown in FIG. 7, one for data reads from the Slave and the other for data writes to the Slave. The existence and depth of each FIFO is determined through parameters. The FIFOs are used to coordinate data queues between the Master and Slave processors. Each FIFO channel data flow is unidirectional to simplify the design and operation; one FIFO is a dedicated read data channel, the other a dedicated write data channel. Despite the inherent synchronization delays, the FIFO design is such that a data reserve is not required (a data reserve is typically added to accommodate write overruns due to slow occupancy calculation as the result of synchronization delays or operating speed differences).

Provided the FIFO does not become empty (or encounters an error condition), the Master and Slave may access it concurrently. A FIFO may therefore offer a better throughput than a mailbox based data pipe which must be loaded by one processor before being read by the other.

However, the FIFO contents are loaded and unloaded in order, and are not randomly accessible like the data within a mailbox data pipe. A FIFO is also (by definition) unidirectional. This makes the FIFO better suited to applications needing the fastest means to transfer blocks of data between processors.

An embodiment of a dual or multi-core microcontroller may also contain a 2 channel FIFO for example if a parameter MSI_FIFO_PRESENT=1. The FIFOs are used to coordinate data queues between the Master and Slave processors. Provided the FIFO does not become empty (or encounters an error condition), the Master and Slave may access it concurrently. A FIFO may therefore offer a better throughput than a mailbox based data pipe which must be loaded by one processor before being read by the other. Each FIFO channel data flow is unidirectional to simplify the design and operation; one channel is a dedicated read data channel, the other a dedicated write data channel, as shown in FIG. 7. For consistency, the FIFOs are always referred to with respect to how the Master processor views them.

Furthermore, the FIFO data registers have no associated direction within the register name. However, based on how the Master views these registers, the Master WFDATA register will be the Write FIFO data write (input) register, and the Slave WFDATA register will be the Write FIFO data read register. Similarly, the Master RFDATA register will be the Read FIFO data read (output) register, and the Slave RFDATA register will be the Read FIFO data write register. In the following sections, the data transmitter is the processor that writes data into a FIFO. Conversely, the data receiver is processor that reads data from a FIFO.

A FIFO will be disabled whenever the corresponding enable control bit is cleared (MSIxFIFOCS.WFEN for the Write FIFO, and MSIxFIFOCS.RFEN for the Read FIFO). The FIFO enable control bits are cleared during a device reset. Under normal operating conditions, the FIFOs will remain enabled. However, in the event of a FIFO error, or if the Slave processor has reset (or has stopped responding and needs to be reset), the MSIxFIFOCS. WFEN and MSIxFIFOCS.RFEN control bits can be used to flush and reinitialize the FIFOs as necessary. When disabled, the FIFO contents are wiped (reset to logic '0'), and the address pointers are initialized to the FIFO empty state, where both pointers are set equal to each (in this case, all 0's). The FIFO empty status bit is also set (MSIxFIFOCS.WFEMPTY for the Write FIFO, and MSIxFIFOCS.RFEMPTY for the Read FIFO). After the FIFO is enabled, the empty status bit will remain set until such time that the first data value is written into the FIFO.

Data to be passed from the Master to the Slave processor is written by the Master processor into the Write FIFO data write register (Master MSIxWFDATA[15:0]). The Slave can then read the data from the Write FIFO data read register (Slave MSIxWFDATA). Data to be passed from the Slave to the Master processor is written by the Slave processor into the Read FIFO data write register, MSIxRFDATA[15:0]. The Master can then read the data from the Read FIFO data read register (MSIxRFDATA).

Because each data register access modifies the data channel FIFO address pointers, data is to be written and read as a single entity (i.e. a word or byte). The FIFO data write registers (Master MSIxWFDATA[15:0] and Slave MSIxRFDATA[15:0]) are write only registers. Reading these registers will return all 0's and not affect the FIFO address pointers. The FIFO data read registers (Master MSIxRF- DATA[15:0] and Slave MSIxWFDATA[15:0]) are read only. Writes to these registers will have no effect. Data is written to the next free location within a FIFO when the data transmitter writes to the FIFO data write register (MSIx WFDATA for the Write FIFO, and MSIx-RFDATA for the Read FIFO). The last data written to the FIFO is held in register and is loaded into the FIFO memory by the FIFO FSM on the next system clock edge. A read of this register will return all 0's. This register is not visible to the data receiver processor (on the read side of the FIFO).

When the addressed FIFO location is loaded, the write address pointer is adjusted to point to the next free location within the circular buffer. If there are no remaining free locations, the FIFO full status bit is set (MSIxFIFOCS.WFFULL for the Write FIFO, and MSIx-FIFOCS.RFFULL for the Read FIFO).

Data is read from a FIFO when the data receiver processor reads the FIFO data read register (MSIxWFDATA for the Write FIFO, and MSIxRFDATA for the Read FIFO). The read cycle will access data from the FIFO memory location addressed by the read pointer.

This register is not writeable, nor is it visible to the data transmitter processor (on the write side of the FIFO). After the addressed FIFO location is read, the read address pointer is adjusted to point to the next valid data location within the circular buffer. If there are no remaining locations to be read, the FIFO empty status bit is set (MSIxFIFOCS.WFEMPTY for the Write FIFO, and MSIxFIFOCS.RFEMPTY for the Read FIFO).

The FIFO's may be used in a variety of ways. Data may be requested or pushed to a processor. The data acknowledge may be implied, direct (using the empty status bit state or associated interrupt), or indirect (using a processor to processor interrupt).

For example, according to an embodiment, the FIFO empty status bits are used to generate an interrupt to the data transmitter processor. The FIFO Interrupt Trigger Select bits (RFITSEL1:0] and WFITSEL[1:0]) are used in conjunction with the FIFO address pointers to determine when to generate a data valid interrupt for the receiving processor. These interrupts are intended to be used as part of the data transfer protocol. However, if not required by the application, they may be disabled within the Interrupt Controller macro.

According to an embodiment, when a FIFO is deemed to be empty, the FIFO empty status flag is set and a FIFO Empty interrupt is generated for the data transmitter processor. The interrupt can generated on the logic 0 to logic 1 transition of the empty status flag (MSIxFIFOCS.WFEMPTY for the Write FIFO, and MSIxFIFOCS.RFEMPTY for the Read FIFO). Writing data to the FIFO will clear the empty status flag and send a Data Valid interrupt to the receiver.

Figure 8:
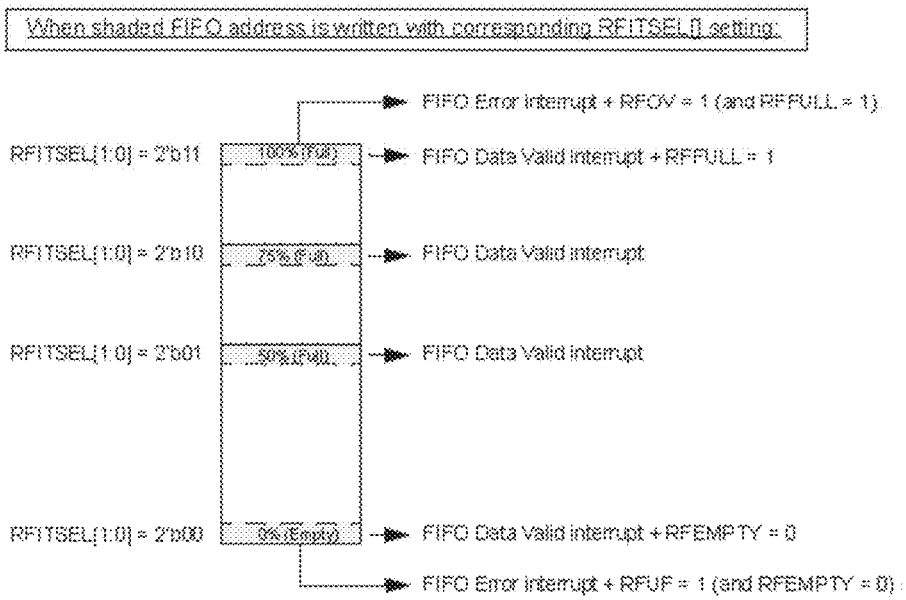
FIG. 8 shows a read FIFO interrupt operation.

When the transmitter processor writes to the FIFO, a Data Valid interrupt pulse may be generated depending upon the state of the FIFO Interrupt Trigger Select bits (RFITSEL1:0] and WFITSEL[1:0] for the Read and Write FIFOs respectively) in conjunction with the contents of the FIFO pointers, as generalized in FIG. 8.

When data is written into a previously empty FIFO, the empty status flag (MSIxFIFOCS.WFEMPTY for the Write FIFO, and MSIxFIFOCS.RFEMPTY for the Read FIFO) is cleared and remains clear until such times that the FIFO become empty again. The interrupt is generated on the logic 1 to logic 0 transition of the empty status flag.

When the data write will result in the FIFO meeting the threshold defined by the FIFO Interrupt Trigger Select bits, a Data Valid interrupt is generated upon the FIFO write that causes the threshold to be met (i.e., not the write to the next FIFO address). Should the data write result in the FIFO becoming full, the full status flag (MSIxFIFOCS.WFFULL for the Write FIFO, and MSIx-FIFOCS.RFFULL for the Read FIFO) will also be set and will remain set until such times that the FIFO is not longer full.

FIFO after the FIFO full status bit is set (MSIxFIFOCS.WFFULL for the Write FIFO, and MSIxFIFOCS.RFFULL for the Read FIFO), the FIFO occupancy logic will detect an overflow condition and set the overflow status flag (MSIxFIFOCS.WFOF for the Write FIFO, and MSIxFIFOCS.RFOF for the Read FIFO). Note that the data write will be ignored, and the FIFO write pointer will not be modified, preserving the contents of the FIFO.

Similarly, in the event that a data receiver attempts to read data from the FIFO after the FIFO empty status bit is set (MSIxFIFOCS.WFEMPTY for the Write FIFO, and MSIx FIFOCS.RFEMPTY for the Read FIFO), the FIFO occupancy logic will detect an underflow condition and set the underflow status flag (MSIxFIFOCS.WFUF for the Write FIFO, and MSIxFIFOCS.RFUF for the Read FIFO). Note that the FIFO read pointer will not be adjusted prior to the read (as would be typical), resulting in a re-read of the most recently read FIFO address.

The Master and Slave processors may interrupt each other directly. The Master may issue an interrupt request to the Slave by asserting the MSIx-CON.MTSIRQ control bit. Similarly, the Slave may issue an interrupt request to the Master by asserting the MSIxCON.STMIRQ control bit.

The interrupts are acknowledged through the use of Interrupt Acknowledge control bits (MSIxCON.MTSIACK for the Master to Slave interrupt request, and MSIxCON.STMIACK for the Slave to Master interrupt request).

All Master/Slave interrupt control/status bits are readable by either processor. The Interrupt Request bits are read/write by the requesting processor, and the Interrupt Acknowledge bits are read/write by the interrupted processor through the MSIxCON control register. The Interrupt Request bits are read only by the interrupted processor, and the Interrupt Acknowledge bits are read only by the requesting processor through the MSIxSTAT status register.

According to an embodiment, when the Master asserts the MSIxCON.MTSIRQ bit, it is synchronized with the Slave clock to become a Slave interrupt. From the Slave perspective, the MTSIRQ bit is a read only status bit at MSIx-STAT.MTSIRQ. The Slave must acknowledge the interrupt by setting the MSIxCON.MTSIACK bit at some point within the handler when servicing the interrupt. After synchronization into the Master clock domain, the Master will observe that MSIxSTAT.MTSIACK=1, and then clear (its view of) the MSIxCON.MTSIRQ bit, rescinding the request. The handshake is completed by the Slave when it observes that MSIxSTAT.MTSIRQ=0. At that point, the Slave clears MSIxCON.MTSIACK to rescind the acknowledge, and the interrupt handler may then exit.

When the Slave asserts the MSIxCON.STMIRQ bit, it is synchronized with the Master clock to become a Master interrupt. From the Master perspective, the STMIRQ bit is a read only bit at MSIxSTAT.MTSIRQ. The Master must acknowledge the interrupt by setting the MSIxCON.STMIACK bit at the end of the handler when servicing of the interrupt is complete. After synchronization into the Slave clock domain, the Slave will observe that MSIxSTAT.STMIACK=1, and then clear (its view of) the MSIxCON.STMIRQ bit, rescinding the request. The handshake is completed by the Master when it observes that MSIx STAT.STMIRQ=0. At that point, the Master clears MSIx CON.STMIACK to rescind the acknowledge, and the interrupt handler.

Figure 9:
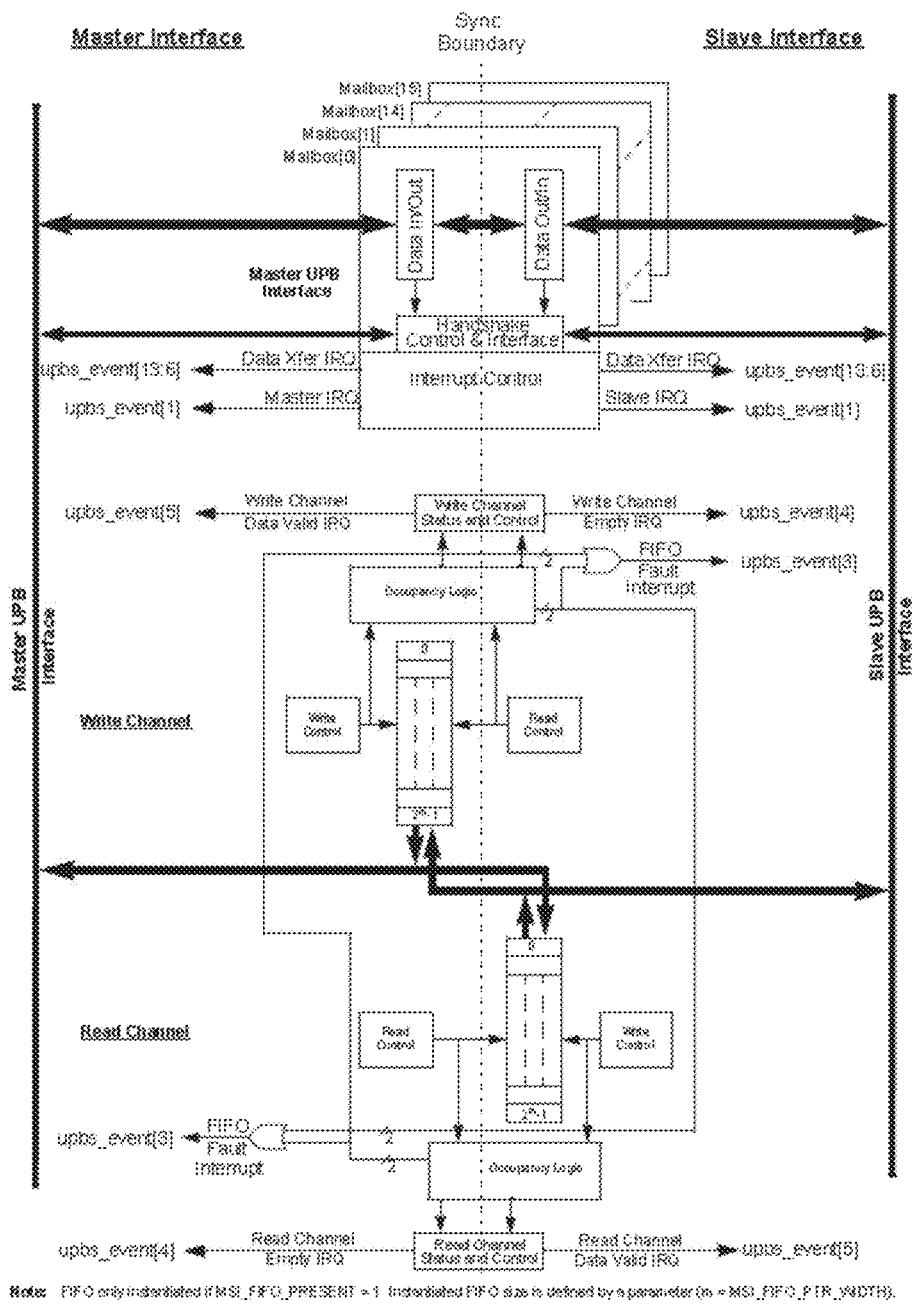
FIG. 9 shows a block diagram of the combined mailbox and FIFO communication interface according to various embodiments.

FIG. 9 shows a combination of a mailbox system as explained above and a FIFO system within the communication interface 130 of FIGS. 1 and 2. As mentioned above, according to an embodiment, the FIFO may be disabled by default and only the mailboxes may be active and user may program the device to enable the FIFO, for example by setting a bit in an associated control register.

The invention claimed is:

1. A single chip microcontroller comprising a master core and a slave core, wherein the master core is clocked by a master system clock and the slave core is clocked by a slave system clock and wherein each core is associated with a plurality of peripheral devices to form a master microcontroller and a slave microcontroller, respectively, further comprising a communication interface between the master microcontroller and the slave microcontroller, wherein the communication interface comprises a plurality of configurable directional data registers coupled with a flow control logic which is configurable to assign a direction to each of the plurality of configurable data registers, and further comprising fuses or configuration registers to configure each directional data registers.

2. The single chip microcontroller according to claim 1, wherein each directional data register is configured by said fuses.

3. The single chip microcontroller according to claim 1, wherein each directional data register is configured by said configuration register.

4. The single chip microcontroller according to claim 1, further comprising handshake logic block configured to provide handshake signals between the master and slave core with respect to the plurality of configurable directional data registers.

5. The single chip microcontroller according to claim 1, wherein the communication interface is further configurable to define a plurality of mailboxes, wherein a configurable number of consecutive data registers of said plurality of configurable data registers is assigned to each mailbox.

6. The single chip microcontroller according to claim 5, further comprising fuses to configure each directional data registers.

7. The single chip microcontroller according to claim 5, further comprising configuration registers to configure each directional data registers.

8. The single chip microcontroller according to claim 5, wherein assignment of registers to a mailbox and a data direction of each of the plurality of configurable data register is programmed during programming of the single chip microcontroller.

9. The single chip microcontroller according to claim 5, wherein one of said configurable registers of a mailbox is used as a control register.

10. The single chip microcontroller according to claim 1, wherein a data direction of a configurable data register is assigned during programming of the single chip microcontroller.

11. The single chip microcontroller according to claim 1, wherein each data register is controlled by a direction signal and a handshake signal.

12. The single chip microcontroller according to claim 1, wherein at least one of said plurality of configurable data registers is as a status register.

13. The single chip microcontroller according to claim 1, wherein at least one of said plurality of configurable data registers is as a command register.

14. The single chip microcontroller according to claim 1, comprising a plurality of multiplexers for defining either a write path only from the master core to one of the configurable data register and a read path from the one of the configurable data register to the salve core or a write path only from the slave core to one of the configurable data register and a read path from the one of the configurable data register to the master core.

15. The single chip microcontroller according to claim 14, wherein when the write path from the master or slave core to one of the configurable data register is set, respectively, a read path from the one of the configurable data register to the master or slave core is available.

16. The single chip microcontroller according to claim 14, wherein when the write path from the master core to one of the configurable data register is set, the master clock provides a clock for writing the one of the configurable data register and the slave clock provides a clock for reading the one of the configurable data register.

17. The single chip microcontroller according to claim 14, wherein when the write path from the slave core to one of the configurable data register is set, the slave clock provides a clock for writing the one of the configurable data register and the master clock provides a clock for reading the one of the configurable data register.

18. The single chip microcontroller according to claim 1, further comprising a read FIFO memory and a write FIFO memory within the communication interface, wherein the read FIFO memory comprises a data input coupled with the slave core and a data output coupled with the master core and the write FIFO memory comprises a data input coupled with the master core and a data output coupled with the slave core.

19. The single chip microcontroller according to claim 18, wherein the read FIFO memory and write FIFO memory are optionally enabled through a configuration register.

20. The single chip microcontroller according to claim 1, further comprising a plurality of slave cores, wherein the communication interface comprises a plurality of data registers sets, each data register set comprising a plurality of configurable directional data registers coupled with a flow control logic which is configurable to assigned a direction to each of the plurality of configurable data registers.

21. A method for providing communication between a master core and a slave core on a single chip microcontroller, wherein the master core is clocked by a master system clock and the slave core is clocked by a slave system clock and wherein each core is associated with a plurality of peripheral devices to form a master microcontroller and a slave microcontroller, respectively, the method comprising:
providing a communication interface between the master microcontroller and the slave microcontroller,
configuring a plurality of configurable directional data registers coupled with a flow control logic to form respective mailboxes by setting fuses or by programming configuration registers,
configuring for each of the plurality of configurable directional data registers a data direction from or to the master core;
exchanging data between the master core and the slave core only through said plurality of configurable directional data registers.

22. The method according to claim 21, the steps of configuring is performed through fuses during programming of the single chip microcontroller.

23. The method according to claim 21, wherein the step of exchanging is performed with handshake signals between the master and slave core.

24. The method according to claim 21, wherein a configurable number of consecutive data registers of said plurality of configurable data registers is assigned to each mailbox.

25. The method according to claim 24, wherein one of said configurable registers of a mailbox is used as a control register.

26. The method according to claim 24, wherein at least one of said plurality of configurable data registers is as a status register or a command register.

* * * * *